United States Patent [19]

Nakadaira et al.

[11] 3,912,280

[45] Oct. 14, 1975

[54] AUTOMATIC MECHANISM FOR USE IN PHONOGRAPH

[75] Inventors: Isamu Nakadaira; Takashi Saito, both of Yokohama, Japan

[73] Assignee: Victor Company of Japan, Limited, Japan

[22] Filed: Dec. 14, 1973

[21] Appl. No.: 424,888

[30] Foreign Application Priority Data

Dec. 15, 1972 Japan .............................. 47-143935

[52] U.S. Cl. ................................................ 274/1 L
[51] Int. Cl.² ......................................... G11B 17/02
[58] Field of Search .................................... 274/1 L

[56] References Cited

UNITED STATES PATENTS 3,049,354 8/1962 Guest ................................ 274/1 L

*Primary Examiner*—Harry N. Haroian
*Attorney, Agent, or Firm*—Robert E. Burns; Emmanuel J. Lobato; Bruce L. Adams

[57] ABSTRACT

Improvement is made in a known automatic mechanism provided for automatic pickup arm returning or for automatic record disk changing. In order to perform the known automatic operation, a single complete revolution of a gear is utilized. The gear engages a driving pinion, which rotates with a turntable, after completion of play to effect rotation of the gear for one revolution. The intention of the present invention is to ensure this engagement between the driving pinion and the gear by providing a frictional member between a pair of pawls which effect engagement of the gear. The frictional member is sheet-like and has one uneven surface to prevent excessively high frictional forces and seizure between the pawls and to reduce variations in the coefficient of friction.

4 Claims, 5 Drawing Figures

AUTOMATIC MECHANISM FOR USE IN PHONOGRAPH

This invention relates to an automatic mechanism for use in sound reproducing apparatus such as phonographs and more particularly to improvement of automatic mechanism for automatic operation, such as returning of a pickup arm or record changing, after the completion of play, whereby initial action of the automatic operation is much more ensured.

In certain types of automatic phonographs, automatic operation is carried out during a single complete revolution of a gear which is incorporated into them for this purpose. The gear thus provided for the automatic operation is rotatably mounted below a turntable and a sector of the gear is recessed or cut away so as to be normally disengaged from a driving pinion arranged on a central spindle which is operatively connected with the turntable for rotation therewith. In order to initiate the rotation of the gear, there is pivotally mounted on the gear an engagement pawl which is adapted to engage a projection extending laterally outwardly from the periphery of the central spindle so that the gear is forced to revolve enough to mesh with the driving pinion. The engagement pawl is normally held in a retracted position and is pushed inwardly for engagement with the projection by means of a suitable slide, which slide comes into operation when a pickup arm reaches the terminal groove of the record being played.

In the above-described prior art, however, a substantial problem is encountered as described below. Under certain circumstances, the engagement pawl does not engage the projection rotating with the central spindle but is pushed away radially outwardly by it. In the above case, provided that the distance the pawl is pushed away or displaced is not large, there is possibility of engagement of the pawl with the projection due to further radial inward advancement of the pawl. However, if the distance it is pushed away or displaced is considerably large, the projection will fail to engage the pawl, that is, the automatic operation fails.

The present invention is, therefore, intended to obviate the above-mentioned disadvantage by providing an improved frictional member for controlling or reducing the displacement distance.

Accordingly, it is an object of the present invention to provide a frictional member to ensure initiation of rotation of the gear in the automatic mechanism by reducing the above-mentioned displacement distance.

It is further within the contemplation of the present invention to provide a frictional member having an uneven surface on one side to reduce excessive friction produced thereby and to avoid unwanted coupling of the frictional member to a mating one.

Additional objects as well as features and advantages of the invention will become evident from the detailed description set forth hereinafter when considered in conjunction with the accompanying drawings, wherein like parts in each of the several figures are identified by the same reference numerals and characters, and wherein.

Figure 1:
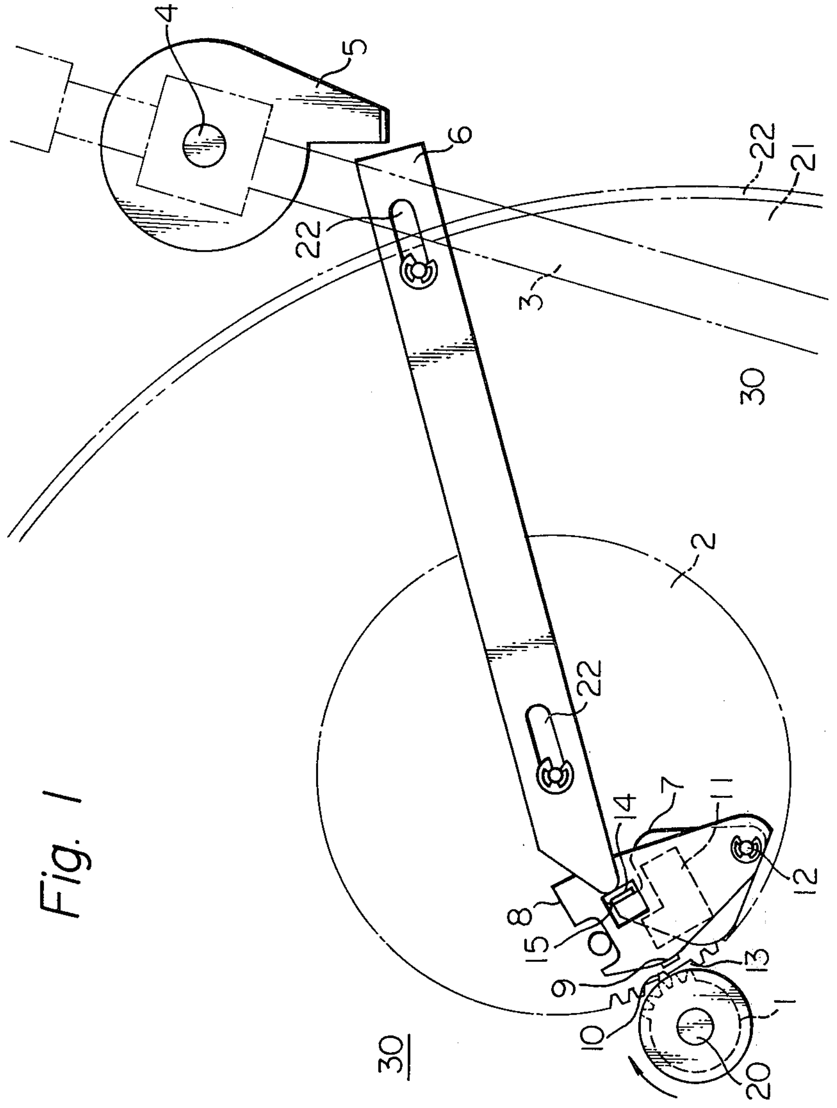
FIG. 1 is a top plan view illustrating an automatic mechanism for use in a phonograph showing an improvement in accordance with the present invention.
Figure 2:
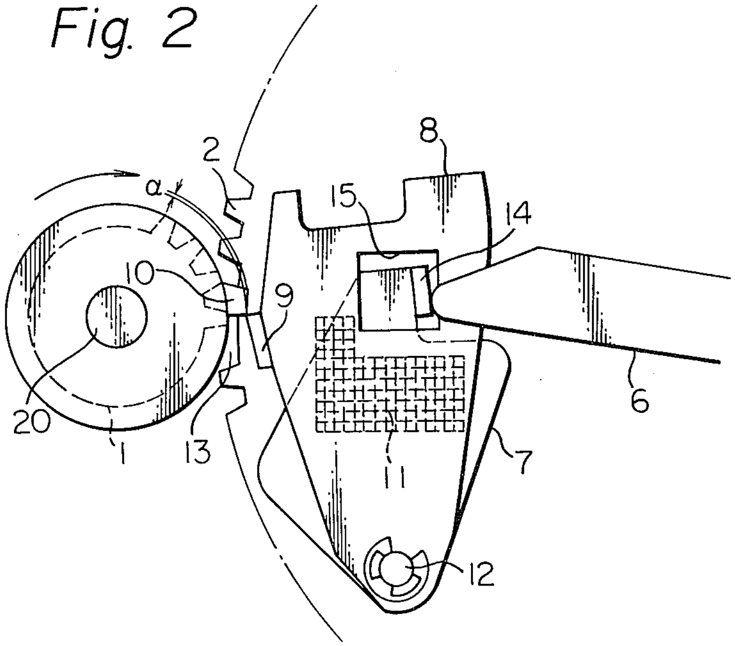
FIG. 2 is an enlarged fragmentary plan view of a portion of the mechanism illustrated in FIG. 1.
Figure 4:
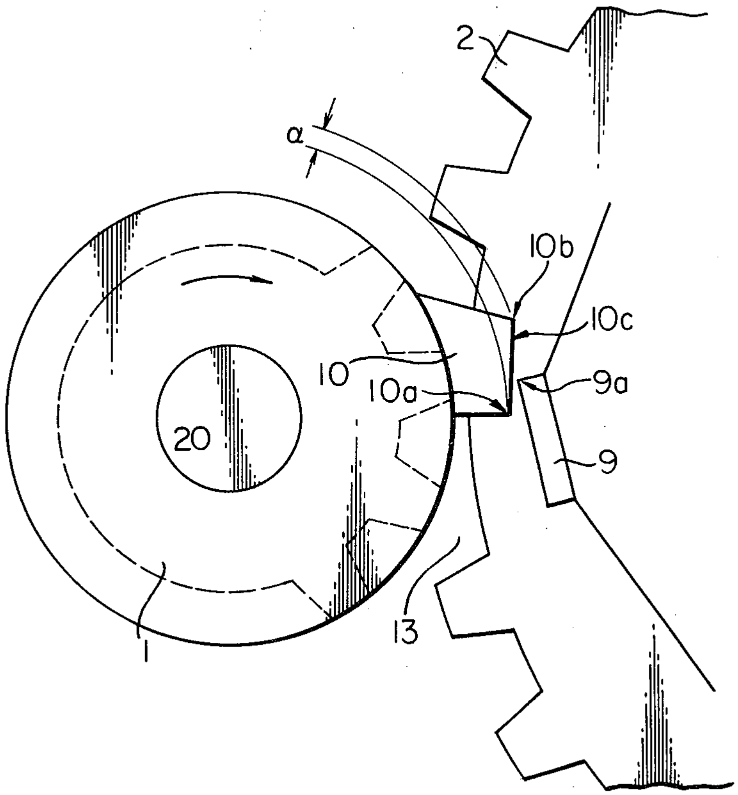
FIGS. 4 and 5 are further enlarged fragmentary plan views of a portion of the mechanism illustrated in FIG. 1, which show motional states to clarify the operation of the mechanism.
Figure 5:
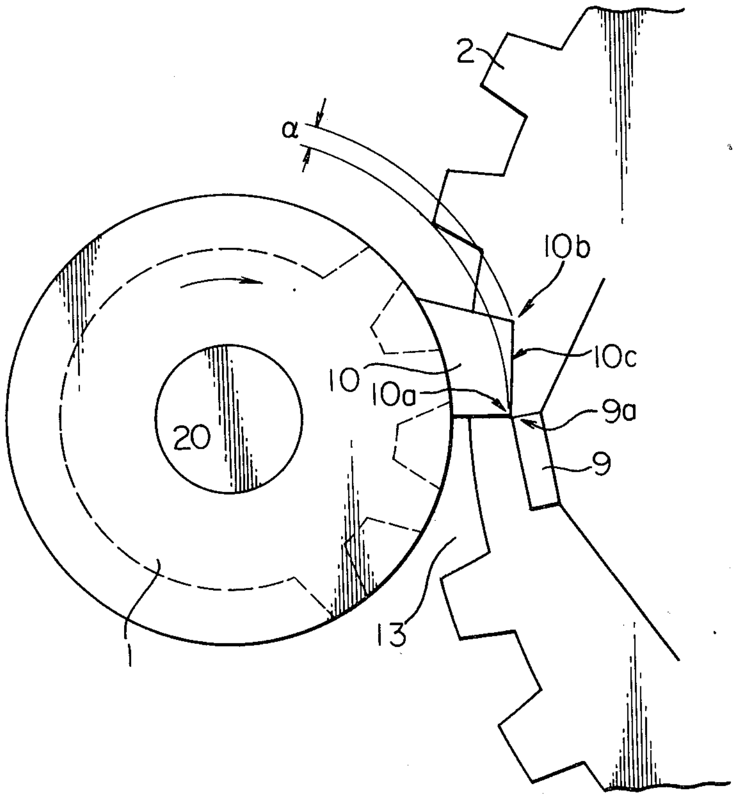

For detailed description of the present invention, reference is now made to the accompanying drawings, wherein there is illustrated an improvement according to the present invention together with a conventional mechanism in which the improvement is to be made. In the following description, firstly there will be described the operation of a conventional mechanism, and secondly an operation in the case where the prior art mechanism has been improved. As illustrated in the drawings, a phonograph table or base 30 is provided with a turntable 22 which supports a disk record 21. Shown in phantom is a pickup arm 3 carrying at one end a pickup mechanism (not shown) including a stylus or a needle, and at a portion near the other end a pushing member 5 which is fixedly mounted thereon by means of a shaft 4. As is customary, the pickup arm 3 advances inwardly (upward in the drawings) with the playing of the record 21. Therefore, the pushing member 5 also advances inwardly with the movement of the pickup arm 3. A center spindle 20, which is rotatably mounted on the base panel 30, serves to center the record 21 and retain it on the turntable 22. The center spindle 20 is equipped with a driving piston 1 which is normally disengaged from a gear 2 because it faces a toothless sector 13 of the gear 2. From the periphery of the center spindle 20 extends a projection 10 which is adapted to engage an extension 9 extending upwardly (upward of the drawings) from an engagement pawl 8 to revolve slightly the gear 2, that is, to initiate the automatic operation. Then, the slight movement of the gear 2 causes the driving pinion 1 to mesh with the gear 2. As seen in FIGS. 1 and 2, the engagement pawl 8 and a trip pawl 7 both are pivotally mounted on the gear 2 such that the former is superimposed upon the latter. Reference numeral 11 designates a frictional member which is interposed between the engagement and trip pawls (8 and 7). As mentioned at the outset, an important feature of the present invention is the provision and improved configuration of the frictional member 11 and therefore it will be described in detail hereinafter. It is to be noted that a conventional mechanism is not equipped with the frictional member 11. In the conventional mechanism the engagement pawl 8 is carried radially inwardly by the trip pawl 7 due to the friction generated therebetween by the weight of the pawl 8. An extension 14 extends upwardly from the trip pawl 7 through an opening 15 which is formed in the engagement pawl 8. As shown in the drawings, there is provided a slide 6 having two elongate slots 22 therein accommodating two stationary supports permitting movement of the slide 6 in the radial direction. In the arrangement described above, when the one end of the pickup arm 3 advances toward the center with the playing of the record 21, the pushing member 5 turns toward the center, resulting in pushing the slide 6 toward the extension 14. As the stylus or needle approaches the terminal groove, the slide 6 begins to push the extension 14 of the trip pawl 7. As described above, the engagement pawl 8 advances with the trip pawl 7 due to the friction produced therebetween by the weight of the pawl 8 so that the extension 9 is forced to jut out above the portion of the toothless sector 13. The engagement of the projection 10 with the extension 9 is accomplished as follows. As illustrated in detail in FIG. 4, a corner 10*b* of the projection 10 projects radially more than a corner 10*a* by a length of $\alpha$. The length of $\alpha$ is selected to be larger than the radial approach of the projection 9 toward the center per one revolution of the record when it is played, so that the projection 10 hits the extension 9 at a slanted surface portion 10c and pushes the extension 9 radially slightly outwardly. Furthermore the radial inward advancing distance of the projection 9 per one revolution of the record 21 becomes greater when the stylus engages the terminal groove, so that the projection 9 is not contacting the slanted portion 10c but completely engages the projection 10, resulting in the fact that the gear 2 is forced to advance to mesh with the pinion 1 to make a single complete revolution. In FIG. 5 there is illustrated the unwanted operation inherent in the prior art. That is, under certain circumstances the corner 9a of the extension 9 is struck by the corner 10a of the projection 10, resulting in the fact that the extension 9 rebounds outwardly to an extent so great that the further radial inward advancement of the extension 9 is not sufficient for the engagement in question. In this case, the automatic operation is never carried out.

Figure 3:
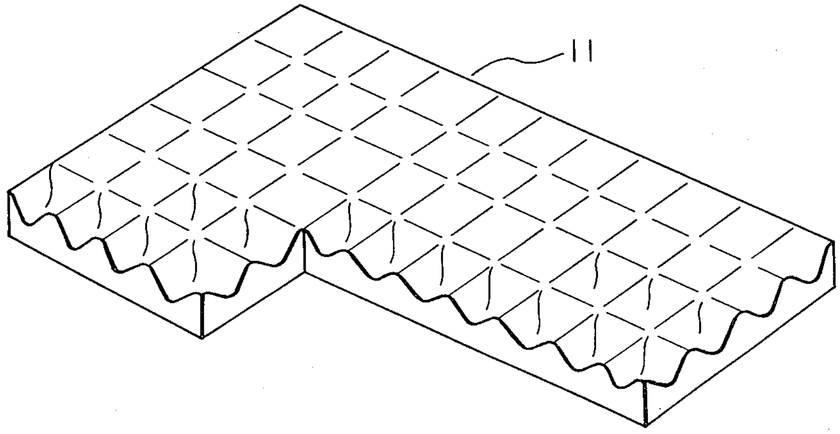
FIG. 3 is a perspective view of a frictional member according to the present invention.

The present invention is, therefore, intended to improve the above conventional mechanism and contemplates to obviate the above-mentioned disadvantage. The present invention is intended generally to firstly provide a frictional member 11 between the trip pawl 7 and the engagement pawl 8 for enhancement of friction therebetween; and secondly to reduce excessive friction and/or unwanted locking, both of which take place in the case where a member having flat surfaces like a sheet is used as a frictional member, to this end the frictional member 11 has one uneven surface. Locking as mentioned above, is liable to occur when the atmospheric temperature is high and/or the humidity is also high, and the pawls 7 and 8 lock into one body, so that in this case the afore-mentioned force of collision or shock by the striking of the corner 10 at corner 9a is directly transmitted to the pickup arm 3 through the pawls (7 and 8) and the slide 6 with the result of a stylus flying. The frictional member 11 is usually made of rubber, however, it is to be noted that any material having suitable motional resistance to the pawl (7 and 8), such as felt and synthetic resin, for instance, is useful. In FIG. 3 there is shown the frictional member 11 which has an uneven surface on one major side and flat surface on the other. In practice, its flat surface is adhered on the lower side of the engagement pawl 8 so that the uneven surface contacts with the upper side of the trip pawl 7 when assembled. As is readily anticipated, the flat surface of the frictional member 11 can be adhered on the upper side of the other pawl, i.e., the trip pawl 7. According to the present invention, such locking can be completely eliminated due to the one uneven surface. Additionally, in accordance with our experiments, a phonograph equipped with the frictional element 11 has proven that the probability of occurrence of failure in the engagement of the projection 10 with the extension 9 is practically nil.

What is claimed is:

1. In an automatic phonograph mechanism of the type having a turntable with a center spindle having a radial projection; a drive pinion mounted on said center spindle to rotate therewith; a second gear rotatably mounted opposite said drive pinion to engage therewith, said second gear having a portion free of gear teeth normally positioned opposite said drive pinion so that said drive pinion and said second gear are disengaged; a first pawl and a second pawl pivotally mounted on said second gear, said first pawl superimposed on said second pawl and in frictional contact with said second pawl, said first pawl having an extending portion extending toward said center spindle; a slide cooperative with a pickup arm for pivoting said second pawl toward said center spindle as the pickup arm advances toward the center of said turntable, said first pawl in frictional contact with said second pawl pivoting therewith to effect engagement between the radial projection of said spindle and the extending portion of said first pawl to advance said second gear to engage said drive pinion to effect one complete revolution of said second gear, wherein the improvement comprises:

a sheet-like member interposed between said first and second pawls to effect frictional contact with said first and second pawls, said sheet-like member having one uneven surface effective to prevent excessively high frictional forces and seizure between said one uneven surface and an adjacent one of said pawls and effective to reduce variations in the coefficient of friction between said uneven surface and the adjacent one of said pawls, whereby excessive rebounding of said first pawl upon contacting the radial projection of said center spindle is prevented.

2. In an automatic phonograph mechanism according to claim 1, wherein the material of said sheet-like member is rubber.

3. In an automatic phonograph mechanism according to claim 1, wherein the material of said sheet-like member is felt.

4. In an automatic phonograph mechanism according to claim 1, wherein the material of said sheet-like member is synthetic resin.

* * * * *